US007686198B2

(12) United States Patent
Liang et al.

(10) Patent No.: US 7,686,198 B2
(45) Date of Patent: Mar. 30, 2010

(54) NAIL GUN BUSHING AND CYLINDER VALVE ARRANGEMENT

(75) Inventors: Chia-Sheng Liang, Taipei Hsien (TW); Lun-Hung Kuo, Taipei Hsien (TW)

(73) Assignee: De Poan Pneumatic Corp., Taipei (TW)

( * ) Notice: Subject to any disclaimer, the term of this patent is extended or adjusted under 35 U.S.C. 154(b) by 89 days.

(21) Appl. No.: 12/179,602

(22) Filed: Jul. 25, 2008

(65) Prior Publication Data

US 2010/0019015 A1 Jan. 28, 2010

(51) Int. Cl.
*B23B 45/04* (2006.01)
*B23D 15/00* (2006.01)

(52) U.S. Cl. .................................... 227/130; 227/129

(58) Field of Classification Search ................. 227/130, 227/129, 110

See application file for complete search history.

(56) References Cited

U.S. PATENT DOCUMENTS 3,672,029 A * 6/1972 Butriss .................... 29/243.56
3,920,088 A * 11/1975 Dudek ........................ 173/169
3,924,961 A * 12/1975 Hess et al. .................... 415/32
4,117,767 A * 10/1978 Elliesen ........................ 91/461
4,165,203 A * 8/1979 Latzina et al. ............. 415/113
4,294,391 A 10/1981 Obergfell
4,319,705 A 3/1982 Geist et al.
4,384,668 A * 5/1983 Tutomu et al. ................. 227/8
4,401,251 A * 8/1983 Nikolich ..................... 227/130
4,404,894 A * 9/1983 Oesterle ...................... 91/461
4,416,338 A * 11/1983 Nelson et al. .............. 173/206
4,784,308 A 11/1988 Novak et al.
5,020,712 A * 6/1991 Monacelli ...................... 227/8
5,909,836 A * 6/1999 Shkolnikov et al. ........... 227/8
6,044,917 A * 4/2000 Brunhoelzl ................ 173/93.5
6,679,413 B2 * 1/2004 Miller et al. ................ 227/120
7,185,712 B2 * 3/2007 Miller et al. .................. 173/1
2006/0001800 A1 1/2006 Sanelle et al.

* cited by examiner

*Primary Examiner*—Brian D Nash
(74) *Attorney, Agent, or Firm*—Chun-Ming Shih

(57) ABSTRACT

A bushing for conducting air in a nail gun is arranged between an air chamber and a cylinder received in a housing of the nail gun. The bushing is adjacent to a bottom of a main valve for driving hitting motion of the nail gun. A number of main valve holes that are adjacent to the main valve are formed in a sidewall of the cylinder. At least one air inlet is formed in a bottom of a sidewall of the cylinder. An air flow passage is defined in the housing and is in communication with the main valve and the air hole. A valve plug which is configured for opening or closing the air flow passage is received in the air flow passage. The valve plug divides the air flow passage into an upper portion and a lower portion. The lower portion is formed in the housing. An annular end surface is formed on a top of the bushing. The annular end surface defines a main air inlet for the main valve. An end portion extends from the bushing and having the upper portion of the air flow passage formed therein. The bushing further includes at least one upper air hole in communication with the air chamber, the main inlet and the upper portion of the air flow passage.

5 Claims, 7 Drawing Sheets

NAIL GUN BUSHING AND CYLINDER VALVE ARRANGEMENT

BACKGROUND

Generally, nail guns have an air chamber for collecting pressurized air from an air source as a power source for nail guns and a cylinder mounted in a housing. The cylinder may be movably relative to the housing or be fixed on the housing. The cylinder includes a piston slidably disposed therein. The piston divides an inner chamber of the cylinder into a top cylinder chamber and a lower cylinder chamber. The nail gun also includes a trigger valve that is capable of being triggered by pressing so as to drive nail hitting action of the nail gun. The pressurized air in the air chamber enters into the top cylinder chamber to press the piston move downwardly when a trigger of the trigger valve is pressed. The pressurized air in the top cylinder chamber vents from the top cylinder chamber and enters into the lower cylinder chamber to drive the piston move upwardly to its original position.

Nail guns employing movable cylinders have been developed, for example, U.S. Pat. No. 4,784,308, U.S. Pat. No. 4,319,705 and U.S. Pat. No. 4,294,391 disclose a nail gun employing a movable main valve and a movable cylinder separated from the main valve. The main valve can move downwardly or upwardly together with the cylinder. Specifically, the pressurized air in the air chamber drives the main valve and the cylinder to move upwardly when the trigger is pressed. As such, the air venting passage of the lower cylinder chamber, and the air flow passage between the main valve and the cylinder are opened. As a result, the pressurized air in the air chamber enters into the top cylinder chamber to move the piston downwardly to hit the nail. The main valve drives the cylinder move downwardly to its original position when the trigger is released. In this instance, the upper air venting passage is opened such that the piston move upwardly back to its original position.

In each of the aforementioned nail guns employing movable main valves and movable cylinders, an air flow passage is employed to conduct pressurized air to drive the main valve and the cylinder to move so as to control the piston moving upwardly back to its original position. In addition, the air flow passage is formed in a number of separate parts, for example, movable cylinder, inner sidewall of the housing and a bushing disposed around the cylinder. The structure of the air flow passage is too complicated. As a result, controlling of nail hitting of the nail gun is unstable. This issue becomes significant especially after the nail gun has been used for a period due to abrasion between different parts. In addition, a cost of manufacturing such an air flow passage is also very high. Therefore, there is a desire to provide a nail gun employing movable main valve and movable cylinder which can achieve a high stability of controlling of nail hitting.

BRIEF SUMMARY

To overcome aforementioned problem, an object of the present invention is to provide a bushing mounted in a nail gun. The air flow passage is integrally formed in the bushing so as to improve a stability of controlling of nail hitting motion and reduce a complexity of the air flow passage.

In one embodiment, a bushing for conducting air in a nail gun is provided. The bushing is arranged between an air chamber and a cylinder received in a housing of the nail gun. The bushing is adjacent to a bottom of a main valve for driving hitting motion of the nail gun. A number of main valve holes that are adjacent to the main valve are formed in a sidewall of the cylinder. At least one air inlet is formed in a bottom of a sidewall of the cylinder. An air flow passage is defined in the housing and is in communication with the main valve and the air hole. A valve plug which is configured for opening or closing the air flow passage is received in the air flow passage. The valve plug divides the air flow passage into an upper portion and a lower portion. The lower portion is formed in the housing.

An annular end surface is formed on a top of the bushing. The annular end surface defines a main air inlet for the main valve. An end portion extends from the bushing and having the upper portion of the air flow passage formed therein. The bushing further includes at least one upper air hole in communication with the air chamber, the main inlet and the upper portion of the air flow passage.

In the present nail gun, the upper portion of the air flow passage is only integrally formed in the bushing, which can facilitate improving a stability of controlling of nail hitting motion. Furthermore, the upper portion of the air flow passage has a more simplified structure; a simple manufacturing process and low cost of the present nail gun can be achieved.

In addition, other embodiments are as follows.

An annular groove is formed in an inner side surface of the bushing. The annular groove is in communication with the upper portion of the air flow passage and the main valve holes. The upper air hole is in communication with the annular groove and the air chamber.

At least one locking member extends from the bushing, and at least a portion of the locking member is structured to be capable of being received and secured in a groove formed in an inner sidewall of the housing.

At least one lug portion extends from the bushing, at least an end of the lug portion is capable of being received in a groove formed in an inner sidewall of the housing, a receiving groove is formed in the lug portion, and a cushion is received in the receiving groove.

In order to fully disclose the present invention, the bushing in the nail gun will be described in detail with reference to Figures as follows.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
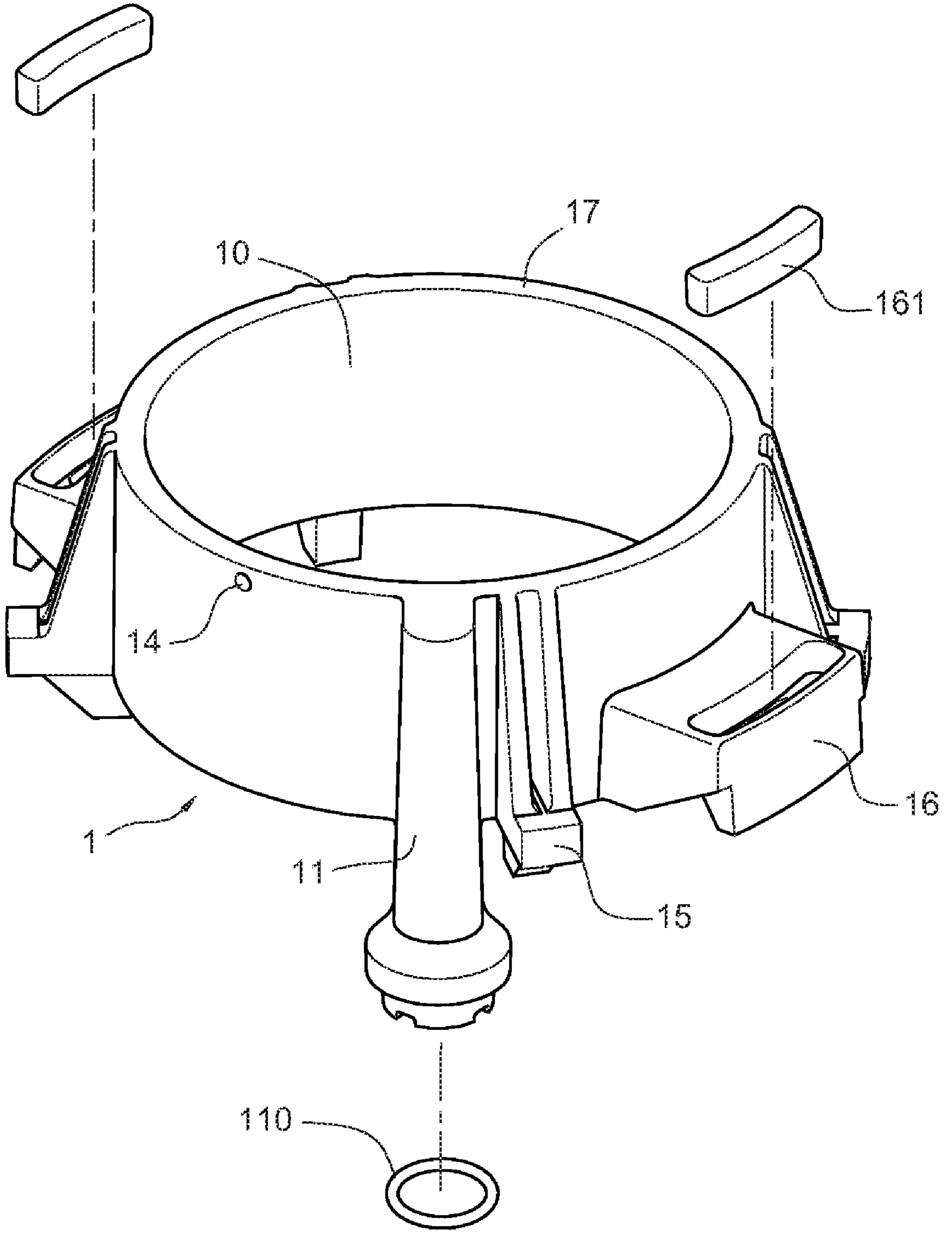
FIG. 1 is an exploded isometric view of a bushing in a nail gun in accordance with a first embodiment.
Figure 2:
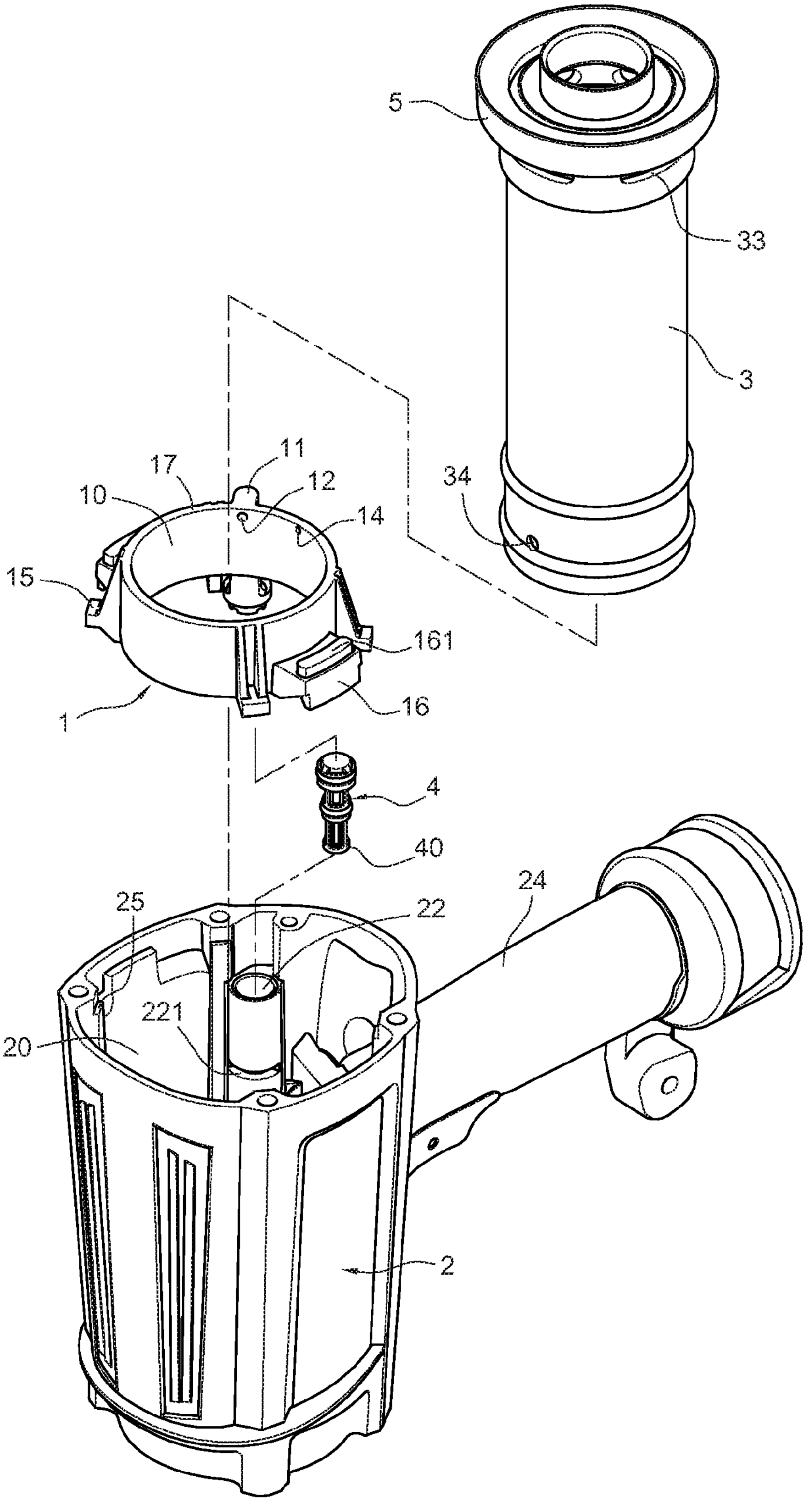
FIG. 2 is another exploded isometric view in accordance with the first embodiment.

FIG. 1 illustrates an exploded view of a bushing 1 for a nail gun in accordance with a first embodiment. Referring to FIG. 2 together, the bushing 1 is between an air chamber 20 in a housing 2 of the nail gun and a movable cylinder 3 (referring together with FIG. 4). The bushing 1 is also adjacent to a bottom of a main valve 5 which is configured for driving hitting motion of the nail gun. A top of a sidewall of the cylinder 3 includes a number of main valve holes 33 formed therein. The main valve holes 33 are adjacent to the main valve 5. A bottom of the sidewall of the cylinder 3 includes at least one air inlet 34 formed therein. The air inlet is communication with an inner chamber of the cylinder. An air flow passage 21 (as shown in FIG. 5) is formed in the housing 2. The air flow passage 21 is between and in communication with the main valve holes 33 and the air inlet 34. The air flow passage 21 receives a valve plug 4 that is capable of opening or blocking the air flow passage 21 therein. The air flow passage 21 divides the air flow passage 21 into an upper portion 12 and a lower portion 23. The lower portion 23 is formed in the housing 2.

Figure 3:
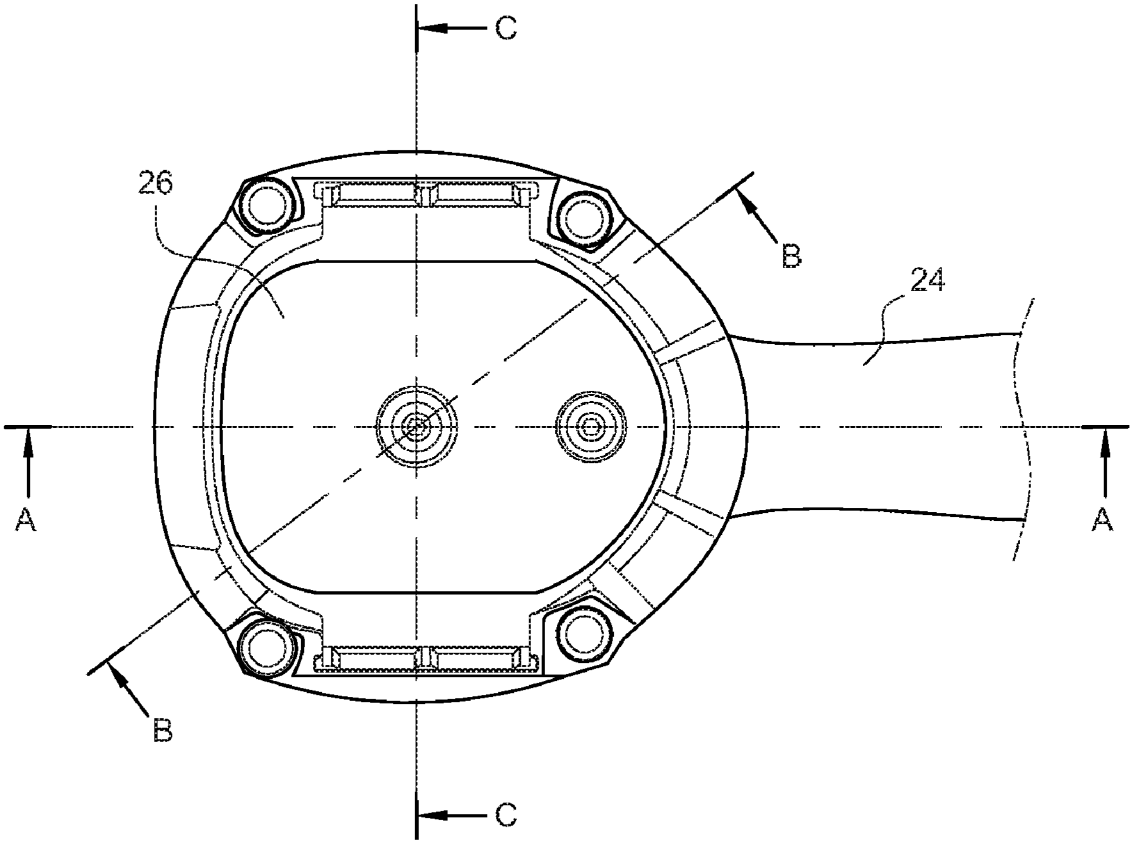
FIG. 3 is a top view of a housing of the nail gun of FIG. 1.
Figure 4:
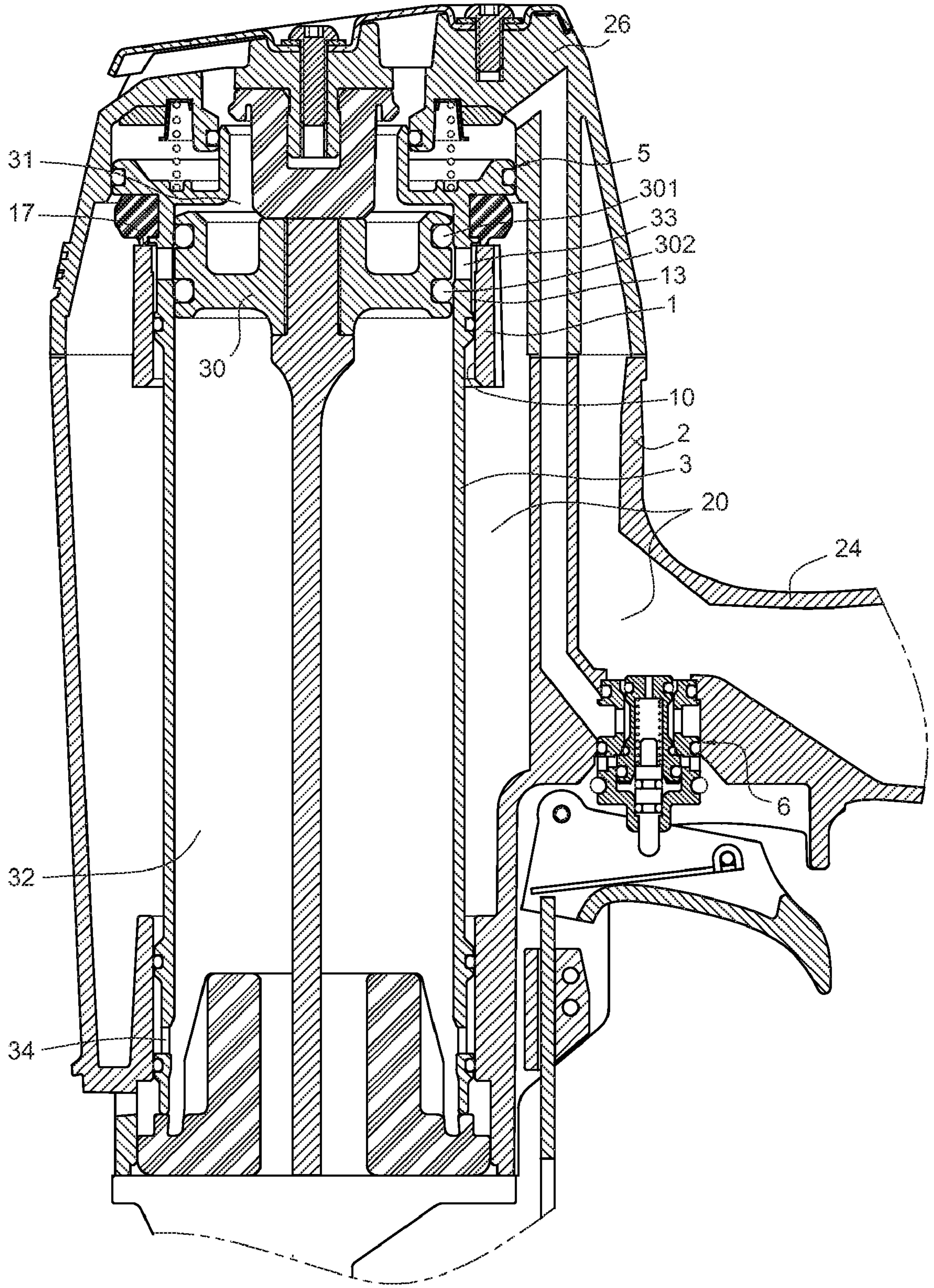
FIG. 4 is a cross sectional view of FIG. 3 along line A-A line.
Figure 5:
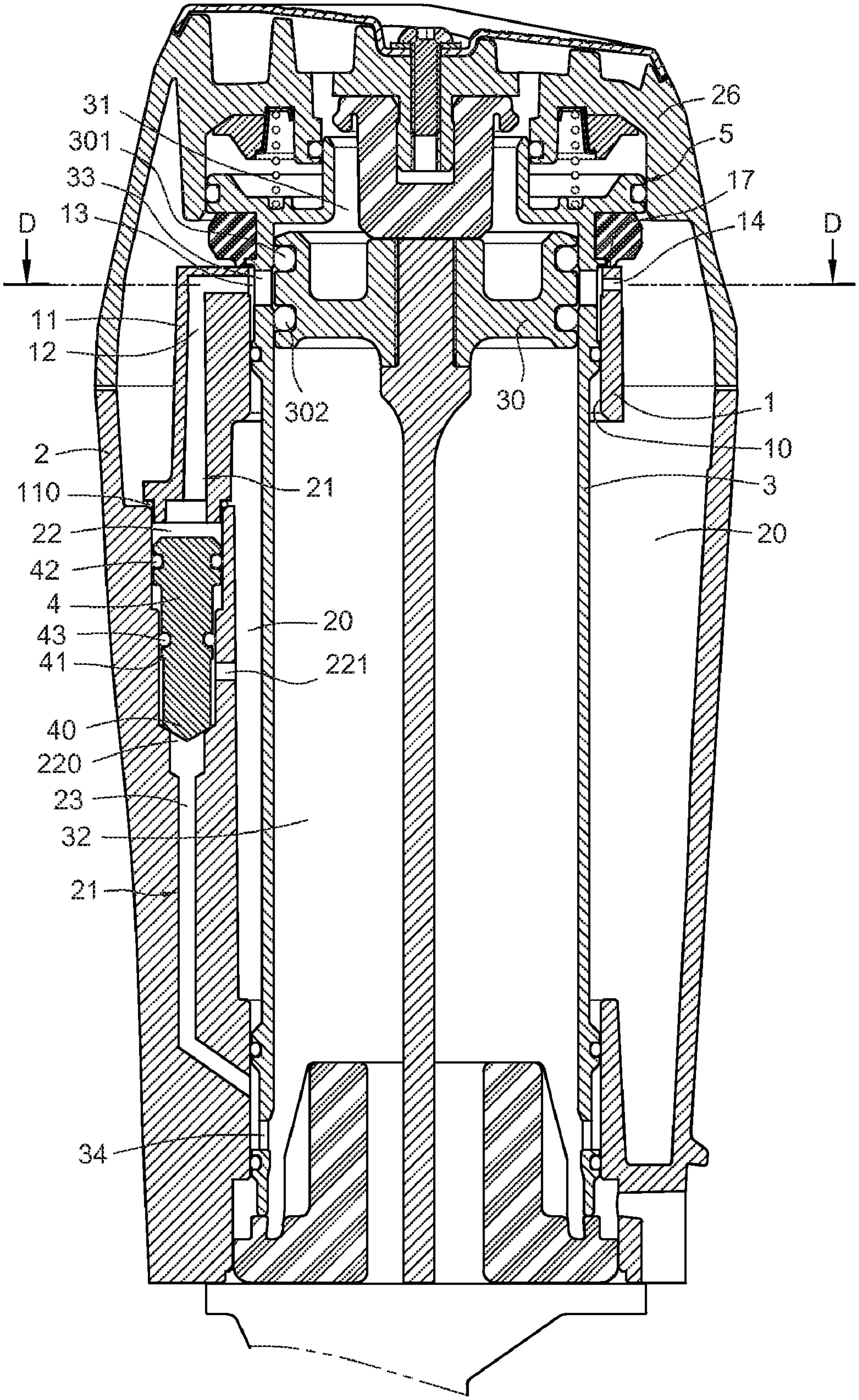
FIG. 5 is a cross sectional view of FIG. 3 along line B-B line.

What is disposed on a top of the housing 2 is a top cover 26 (as shown in FIGS. 3 and 4). The top cover 26 receives a top end of the cylinder 3 therein. The bushing 1 has a central axis hole 10 (as shown in FIGS. 1 and 2) that is capable of accommodating a top end of the cylinder 3. The top cover 26 receives a top end of the bushing 1 and the other end of the bushing 1 extends into the housing 2. The air chamber 20 is formed in the top cover 26 and the housing 2, and extends from a handle 24 to an outer side surface of the cylinder 3. The air chamber 20 is configured for collecting a pressurized air from an outer air source and maintaining a pressure of the pressurized air at a constant level.

Figure 6:
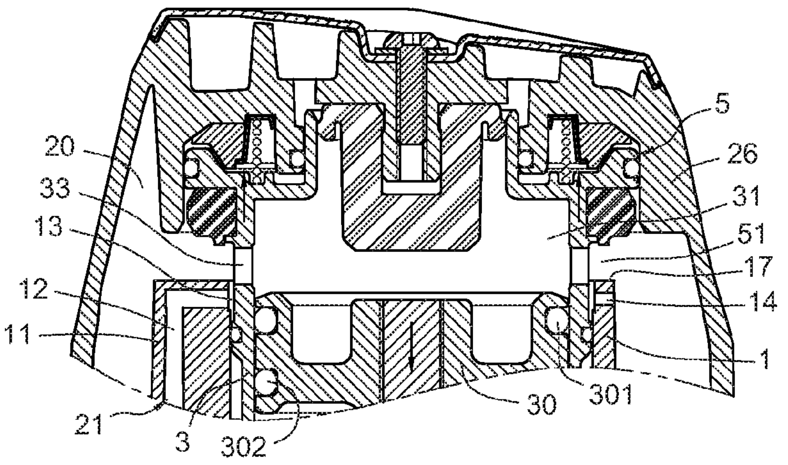
FIG. 6 is a schematic view showing an operation state of a cylinder and a main valve in the nail gun of FIG. 5.

A piston 30 is slidably received in the cylinder 3. The piston 30 divides an inner chamber of the cylinder 3 into an upper cylinder chamber 31 and a lower cylinder chamber 32. An upper sealing ring 301 and a lower sealing ring 302 encompass the piston 30. Specifically, the upper sealing ring 301 and the lower sealing ring 302 are received in respective annular grooves formed in outer side surface of the piston 30. A trigger valve 6 is mounted in the air chamber 20 and is adjacent to the handle 24. The trigger valve 6 is configured for driving the piston 30 to move downwardly to hit a nail and move upwardly to reset its position. The upper sealing ring 301 is above the main valve holes 33, and the lower sealing ring 302 is below the main valve holes 33 before the piston hit the nail. As such, the piston 30 isolates the inner chamber of the cylinder 3 from the main valve holes 33. The upper sealing ring 301 and the lower sealing ring 302 are all below the main valve holes 33 (as shown in FIG. 6) when the piston hit the nail. In such instance, the main valve holes 33 are in communication with the inner chamber of the cylinder 3.

The main valve 5 can be integrally formed on or surround the top of the cylinder 3. The main valve 5 is also in the top cover 26. The air flow passage 21 includes a valve chamber 22 (as shown in FIG. 5) for accommodating the valve plug 4. The valve chamber 22 is formed in the housing 2 and is between the upper portion 12 and the lower portion 23 of the air flow passage 21. A valve port 220 is formed between the valve chamber 22 and the lower portion 23 of the air flow passage 21. A top end of the valve plug 4 is adjacent to the upper portion 12 of the air flow passage 21, and a bottom end of the valve plug 4 is formed into a cone portion 40. A main air hole 221 in communication with the air chamber is formed in a bottom of a side surface of the valve chamber 22. An outer side surface of the valve plug 4 defines an annular trapeziform surface 41 that is above the main air hole 221. At least two sealing gaskets 42, 43 surrounds the valve plug 4 such that upper portion 12 of the air flow passage 21, the valve chamber 22, and the lower portion 23 of the air flow passage 21 are separated from each other. The cone portion 40 can connect the lower portion 23 of the air flow passage to the main air hole 221 and the valve portion 220, or separate the lower portion 23 of the air flow passage to the main air hole 221 and the valve portion 220.

Figure 7:
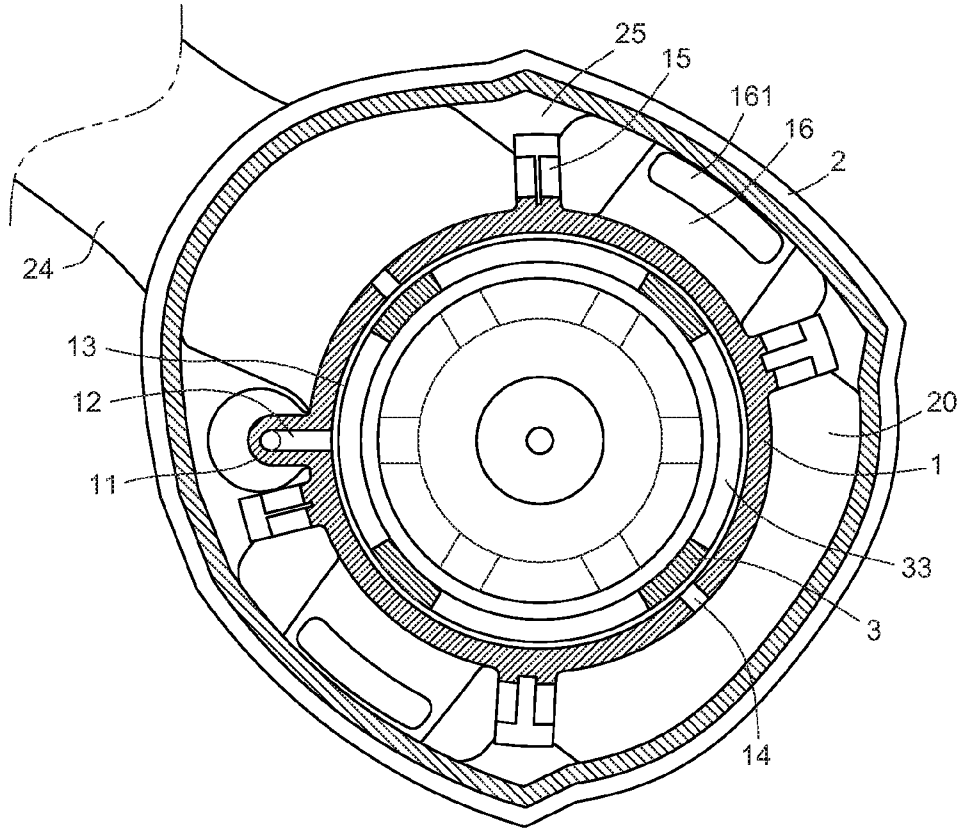
FIG. 7 is a cross sectional view of FIG. 5 along line D-D line.

The top end of the bushing 1 defines an annular end surface 17 (as shown in FIGS. 1, 2 and 4). The annular end surface 17 forms a valve port 51 when the main valve 5 is opened. At least one end portion 11 (as shown in FIGS. 5 and 7) extends from the outer sidewall of the bushing 1. The upper portion 12 of the air flow passage 21 is formed in the end portion 11. The bushing 1 further includes at least one upper air hole 14 formed therein. The upper air hole 14 is in communication with the air chamber 20, the main valve holes 33 and the upper portion 12 of the air flow passage 21.

In another embodiment, an annular groove 13 is formed in the inner sidewall of the bushing 1. The annular groove 13 surrounds the outer surface of the cylinder 3 and is in communication with the upper portion 12 of the air flow passage 21 and the main valve holes 33 (as shown in FIGS. 5 and 7). The upper air hole 14 connects the annular groove 13 to the air chamber 20. A bottom of the end portion 11 extends into the valve chamber 22 such that the upper portion 12 of the air flow passage 21 is in communication with the valve chamber 22. In addition, an air sealing gasket 110 is disposed between the bottom of the end portion 11 and outer side surface of the top of the valve chamber 22 such that the upper portion 12 is separated from the valve chamber 22.

Figure 8:
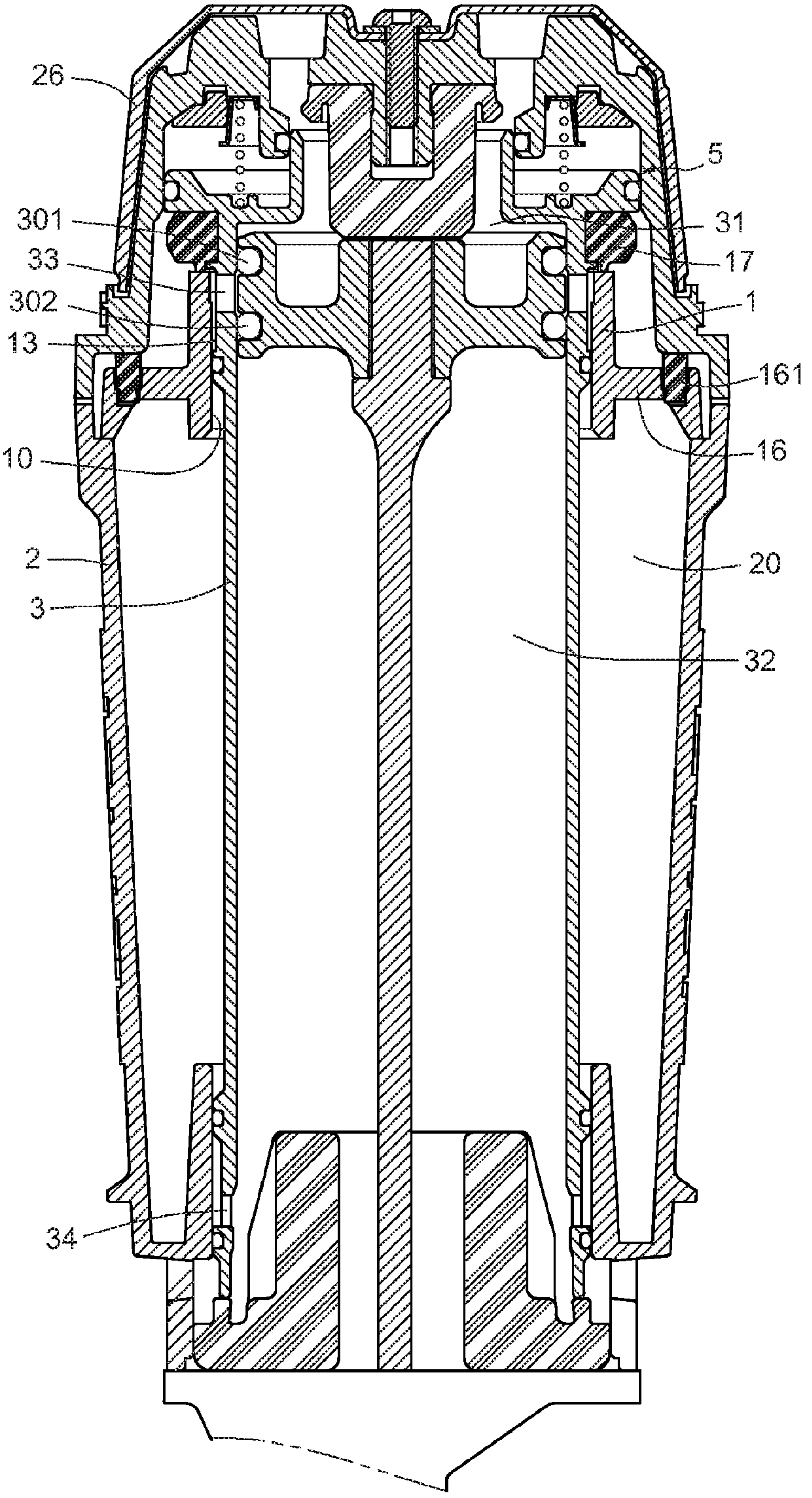
FIG. 8 is a cross sectional view of FIG. 5 along line C-C line.

At least one locking member 15 extends from outer sidewall of the bushing 1 (as shown in FIGS. 1, 2 and 7). At least a portion of the locking member 15 is structured to be capable of being received and secured in a groove 25 formed in an inner sidewall of the housing 2. At least one lug portion 16 extends from the outer sidewall of the bushing 1 (as shown in FIG. 8). At least an end of the lug portion 16 is capable of being received in a groove formed in an inner sidewall of the housing 2. A receiving groove is formed in the lug portion 16, and a cushion 161 is received in the receiving groove. The bushing 1 is fixed in the housing 2 by securing the locking member 15 and the lug portion 16 in the inner sidewall of the housing 2. In addition, the cushion 161 is also received in the inner sidewall of the housing 2, as such, the cushion 161 can release a pressure applied by the top cover 26 to the lug portion 16 in the housing 2. In the present embodiment, four locking members 15 and two lug portions 16 are formed on the bushing 1.

In the present nail gun, the upper portion 12 of the air flow passage 21 is only integrally formed in the bushing 1, which can facilitate improving a stability of nail hitting controlling. Furthermore, the upper portion 12 of the air flow passage 21 has a more simplified structure; a simple manufacturing process and low cost of the present nail gun can be achieved.

In addition, the nail gun can also includes a number of valve chambers 22 and a number of lower portions 23 of the air flow passage 21, and correspondingly, same amount of end portions 11, upper portions 12 of the flow passage 21 can be formed on the bushing 1.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A nail gun including a bushing for conducting air therein, the bushing being arranged between an air chamber and a cylinder received in a housing of the nail gun, and being adjacent to a bottom of a main valve for driving hitting motion of the nail gun, a plurality of main valve holes that are adjacent to the main valve being formed in a sidewall of the cylinder, at least one air inlet being formed in a bottom of a sidewall of the cylinder, an air flow passage being defined in the housing and being in communication with the main valve and the air hole, a valve plug configured for opening or closing the air flow passage being received in the air flow passage, the valve plug dividing the air flow passage into an upper portion and a lower portion, the lower portion being formed in the housing;

wherein an annular end surface is formed on a top of the bushing, the annular end surface defining a main air inlet for the main valve, an end portion extending from the bushing and having the upper portion of the air flow passage formed therein, the bushing further comprising at least one upper air hole in communication with the air chamber, the main inlet and the upper portion of the air flow passage.

2. The nail gun as claimed in claim 1, wherein an annular groove is formed in an inner side surface of the bushing, the annular groove being in communication with the upper portion of the air flow passage and the main valve holes, the upper air hole being in communication with the annular groove and the air chamber.

3. The nail gun as claimed in claim 1, wherein at least one locking member extends from the bushing, at least a portion of the locking member structured to be capable of being received and secured in a groove formed in an inner sidewall of the housing.

4. The nail gun as claimed in claim 1, wherein at least one lug portion extends from the bushing, at least an end of the lug portion is capable of being received in a groove formed in an inner sidewall of the housing, a receiving groove being formed in the lug portion, a cushion being received in the receiving groove.

5. The nail gun as claimed in claim 1, wherein the cylinder is movable relative to the main valve.

* * * * *